(12) United States Patent
Gadher

(10) Patent No.: US 8,028,196 B2
(45) Date of Patent: Sep. 27, 2011

(54) PREDICTIVE DIAGNOSTICS AND FAULT MANAGEMENT

(75) Inventor: Bharat Kumar Gadher, New Brunswick (CA)

(73) Assignee: Gtech Corporation, Providence, RI (US)

(*) Notice: Subject to any disclaimer, the term of this patent is extended or adjusted under 35 U.S.C. 154(b) by 283 days.

(21) Appl. No.: 12/273,159

(22) Filed: Nov. 18, 2008

(65) Prior Publication Data
US 2010/0125753 A1 May 20, 2010

(51) Int. Cl.
*G06F 11/00* (2006.01)
(52) U.S. Cl. .......................................... 714/26
(58) Field of Classification Search .................... 714/26; 463/46
See application file for complete search history.

(56) References Cited

U.S. PATENT DOCUMENTS

| | | | |
|---|---|---|---|
| 5,058,893 A * | 10/1991 | Dickinson et al. | 273/143 R |
| 6,668,203 B1 * | 12/2003 | Cook et al. | 700/65 |
| 6,901,347 B1 | 5/2005 | Murray et al. | |
| 7,246,156 B2 * | 7/2007 | Ginter et al. | 709/217 |
| 2004/0064552 A1 * | 4/2004 | Chong et al. | 709/224 |
| 2004/0102928 A1 * | 5/2004 | Cuddihy et al. | 702/188 |
| 2005/0066239 A1 | 3/2005 | Keeton et al. | |
| 2006/0294238 A1 * | 12/2006 | Naik et al. | 709/226 |
| 2007/0078962 A1 * | 4/2007 | Donnelli et al. | 709/223 |
| 2010/0093445 A1 * | 4/2010 | Mattice et al. | 463/46 |

FOREIGN PATENT DOCUMENTS

WO WO 02/054654 A 7/2002

OTHER PUBLICATIONS

"Notification of Transmittal of the International Search Report and the Written Opinion of the International Searching Authority, or the Declaration", International Application No. PCT/US2009/006031, filed Nov. 9, 2009, mailed Jan. 18, 2010, 13 pages.

* cited by examiner

*Primary Examiner* — Amine Riad
(74) *Attorney, Agent, or Firm* — Sullivan & Worcester LLP; Christopher T. McWhinney

(57) ABSTRACT

The present application discloses a preventative, diagnostic maintenance system designed for gaming systems. Sensor and software monitor, accumulate, store and share information for efficient maintenance of the gaming systems. Diagnostic and prognostic tests are run and results prioritized wherein minor and intermittent problems that indicate potential future problems are stored. When a technician visit is prescribed, the system will present via a GUI a visualization of the status of gamed devices, and, forearm the technician with the high and low priority information regarding the high priority problems along with the low priority problems for all the game devices at the same site. The technician will be able to bring the specific tools, programs and parts to service the high and the low priority problems of all the game devices.

12 Claims, 2 Drawing Sheets

PREDICTIVE DIAGNOSTICS AND FAULT MANAGEMENT

BACKGROUND OF THE INVENTION

1. Field of the Invention

The present invention relates to gaming systems, and more particularly to diagnostic, automatic, prognostic (proactive forward looking) repair services. Gaming systems may include game devices, e.g., video lottery machines, slot machines, racing machines—virtually any type game device; a Retailer Station or host communicating via a local area network (LAN) to the game devices; and a central controller that communicates via a wide area network (WAN) to the retailer and the game devices.

2. Background Information

At the present time maintenance operations on game devices are reactive where repair occurs after a fault or problem has happened. Typically, the game device is down and remains that way until the repair is accomplished. The game device is in either of two states; a "green" state where it is up-and-running; and a "red" state where it is down awaiting repair. Note that the color representation are arbitrary and virtually any designation may be used. A problem is encountered, usually, by a player who informs a human operator at the retailer, e.g., a casino or lottery ticket agent. The operator may diagnose the problem and/or call a service technician, and notify the retailer and the central controller of the problem. The technician will usually call and discuss the problem with the operator so that the technician will bring relevant testing equipment and/or spare parts to fix the problem.

Such a service system is time consuming and wasteful of time and money. The visiting technician may not have a full awareness of the problem and be unprepared when he arrives. Other lower priority problems may not be monitored, and even though they may be easily fixed, the technician may be unaware of the low priority problems. In this case, low priority problems may rise to a full failure requiring an emergency technician visit. For example, a low priority problem might be a bill acceptor operating acceptably but rejecting too many bills. If unattended, the bill acceptor may fail shutting down the game device. A visiting technician could preclude the failure if aware of the problem.

Herein "problem" includes malfunctions and events (something jammed), predictive data or information and trend data. Trend data includes data that tracks information regarding lifetimes of modules in the game devices, or other such data that may suggest future problems. These alternative words may be used herein where syntax and usage suggest.

The technician, moreover, in many cases may not be needed, wherein his trip would be a total waste.

An automated maintenance (synonymous with service) system, that fully monitors gaming devices and automatically communicates and reports problems to retailers and central controllers that, in turn, schedules service technician visits would be advantageous.

SUMMARY OF THE INVENTION

The present invention addresses many maintenance limitations of the known systems and procedures by fully integrating each game device with sensors that monitor and record game device problems or events while accumulating and logging other diagnostic and prognostic data. Events are prioritized and business decisions determine actions based on the priorities. Diagnostic and prognostic tests may be administered and events and trends accumulated and stored locally and later at a central controller.

Advantageously, the present invention provides for geographical mapping displayed on a GUI that assists service technicians. There may be thousands of game devices distributed within thousands of retail locations over a wide geographical area.

Compared to the known prior art, that has only the up-and-running and the down states, the present invention, illustratively, provides a third state that indicates a "minor" problem that will later lead to the down state if left unaddressed. The minor problem may be some intermittent operation or a parameter, like temperature rises, that are not found in typical operational game devices. The intermittent operation may be due to operator abuse, or unusual environments, like high humidity or dust. The present invention provides for an "amber" state along with the "red" and "green" states. Again, note that the colors are representative. The visualization immediately informs the nearest technician of the geographical mapping so that the technician can be fully prepared for servicing one or several sites in the immediate area. The present invention allows the nearest technician to be alerted, the site and nearby sites and maintenance status of each may be displayed, accurate locations and traveling directions may be displayed, and priorities may be determined by location, type of faults or problems and maintenance status, and the financial aspects of the sites.

Illustratively, VLTs (Video Lottery Terminals) are commonly found game devices connected in LANs along with Retailer Stations (a Retailer Station is a terminal that may act as a site or LAN controller). Often the Retailer Station is connected to a Central Controller via the Internet or other WAN. In particular, low priority events and trend data are maintained in the LAN and sent to a central controller when some higher priority event is sent, or when the network traffic is low.

Low priority and/or trend events may include, inter alia: higher than expected temperatures, printer paper getting low or jamming, a bill acceptor rejecting too many bills, button sticking, intermittent problems closing doors, or glitches on a display screen, etc. Low priority events do not disable the operation of a game device, but should be repaired at some time.

High priority events suggest immediate attention and/or repair. Such events might include any event that shuts down the game device, e.g., bill acceptor not working, a video display not working, the VLT not working, etc. These events will be reported via the Retailer to the central controller immediately.

Trending data may be used for prognosis determinations wherein diagnostic and prognostic tests may be self administered locally within the LAN.

Illustratively, the central office may coordinate and respond to reported problems in comprehensive manner. For example a high priority problem arises and is reported to the Central Controller, via the Retailer Station, which may send the lower priority, trend and diagnostic data along with the high priority event. The central controller may send low priority data regarding all the game devices at a site. If a service technician visit is necessary, the central office will automatically inform the service technician about high and all the low priority issues at that site. The central office may also automatically inform the service technician about low priority issues at other sites that will be on his geographic route to reach the site with the high priority problem.

Advantageously, whenever a service technician visits a retailer location, the technician will be forearmed with specific problems and/or symptoms related to all the game devices at that site. The technician will have all the tools, including diagnostic software, and replacement parts, specific to the problems that he needs. This increases the maintenance system efficiency. A GUI may be available for a technician to enter test/diagnostic/prognostic programs. Illustratively, business rules may be applied that enhance the decision for types of responses to the problems. These rules may be amended to accommodate unforeseen problem that may arise.

In one preferred embodiment, the present invention will identify and record instances or symptoms that indicate a potential fault or failure. History may indicate a time frame for servicing the device and a timely service visit may be scheduled.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
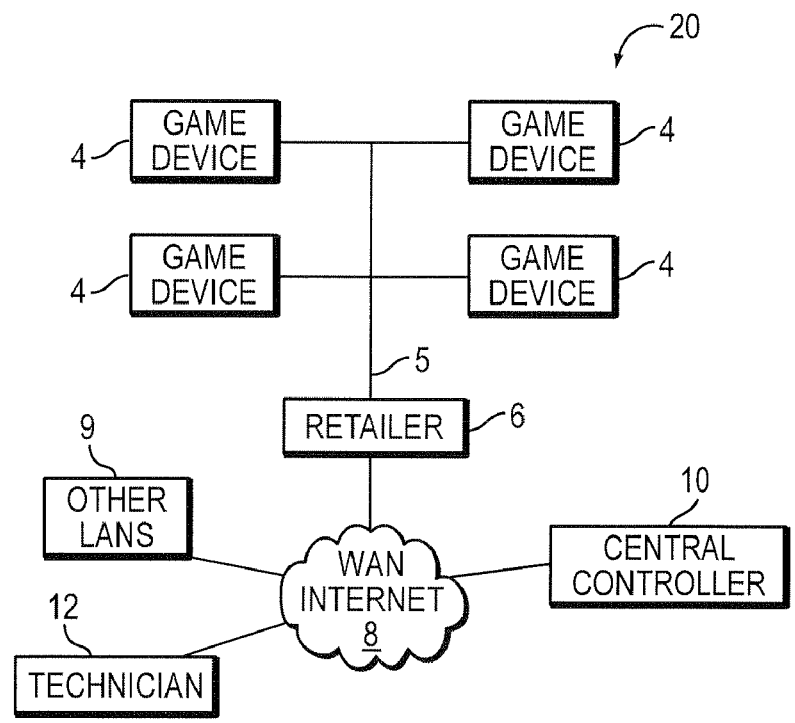
FIG. 1 is a schematic, block diagram of a network with client game devices, a retailer, and a central controller.

FIG. 1 is a schematic block diagram of a wide area computer network 2 that may include a plurality of game devices 4 communicating with a retailer 6 over a local area network 5. The retailer communicates via the Internet 8 or other WAN to a central controller 10. A technician 12 may be primed via the same communications network.

Game devices 4, retailers 6 and a central controller 10 are typically computer servers that may run one or more applications on one or more platforms (hardware and software) suitable for the gaming industry.

Figure 2:
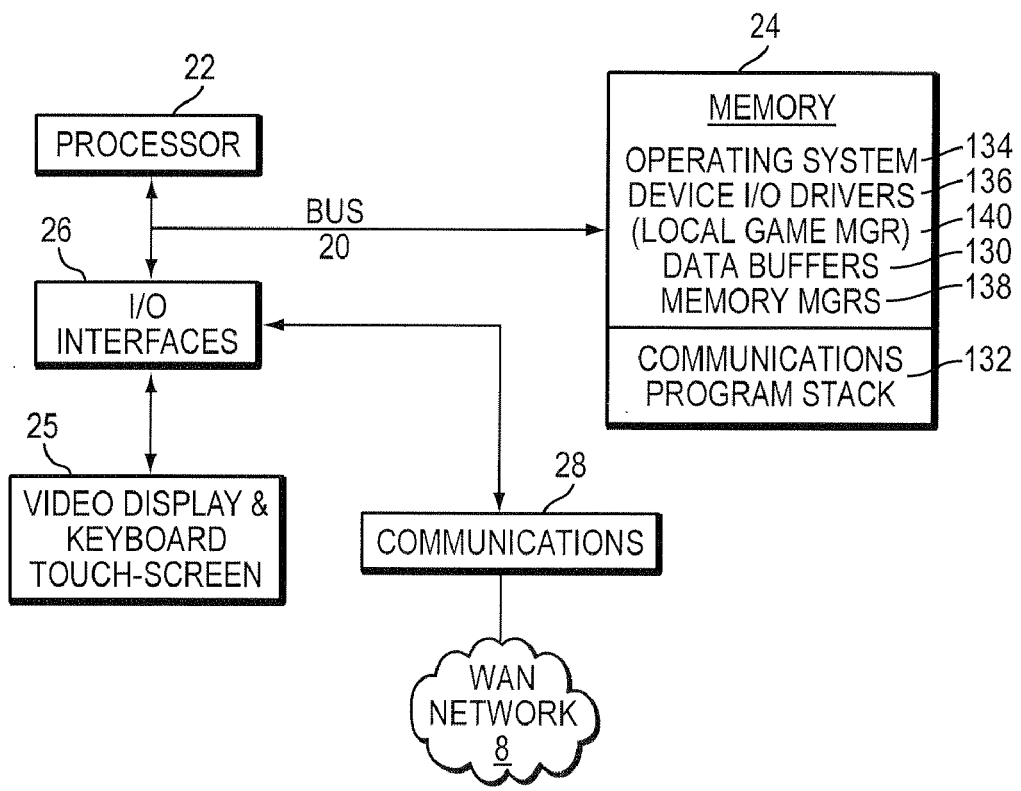
FIG. 2 is a schematic, block diagram of a typical game device, retailer, and central controller.

FIG. 2 is an illustrative block diagram of hardware and some program modules that may be found in a typical game device 4, a retailer 6, and a central controller. The central controller may have a more powerful implementation that performs many operations at high speeds, while the retailer may have more modest in hardware and processing speed, while the game device may have quite modest hardware and software. Regardless, similar electronic blocks may be found in each. A computer bus 20 connects a processor 22 to memory 24; to I/O (Input/Output) interfaces 26; and to communications hardware 28 that connects to the network 30 (here the NETWORK 30 may be the Internet 8 or the LAN).

The processor 22 may be any processor or controller or control logic arranged to execute program code and exercise control over the retailer or game device. Processors made by Intel, AMD, or any other manufacturer may be used, as well as ASIC (Application Specific Integrated Circuit) or other particular designs. The memory 24 usually includes a ROM and a RAM. Again, standard hardware may be used, including electronic or magnetic ROM and RAM, flash, optical, CD's, hard disk drives, etc. External memory, not shown, may be used and include disk and RAID systems. The I/O interfaces 28 may include drives for motors, LED and other displays, printers, touch screens, mouse and keyboard or key, and other such interfaces.

The communications hardware 28 may include drivers for discrete wires, twisted pairs, Ethernets, Optical fiber, wireless and any other transmission types known to those skilled in the art.

A video display and touch screen keyboard 25 provides visual information for playing the game in a game device, controlling and monitoring the devices on an LAN for the Retailer. Such a video display may operate as a graphical users interface (GUI).

In FIG. 2 the memory is shown having: a data storage 130 for local operations, a communications program stack 132 that implements the communications hierarchy; an operating system 134, device drivers 136, memory and other system managers 138 and local game control and operation software 140.

Figure 3:
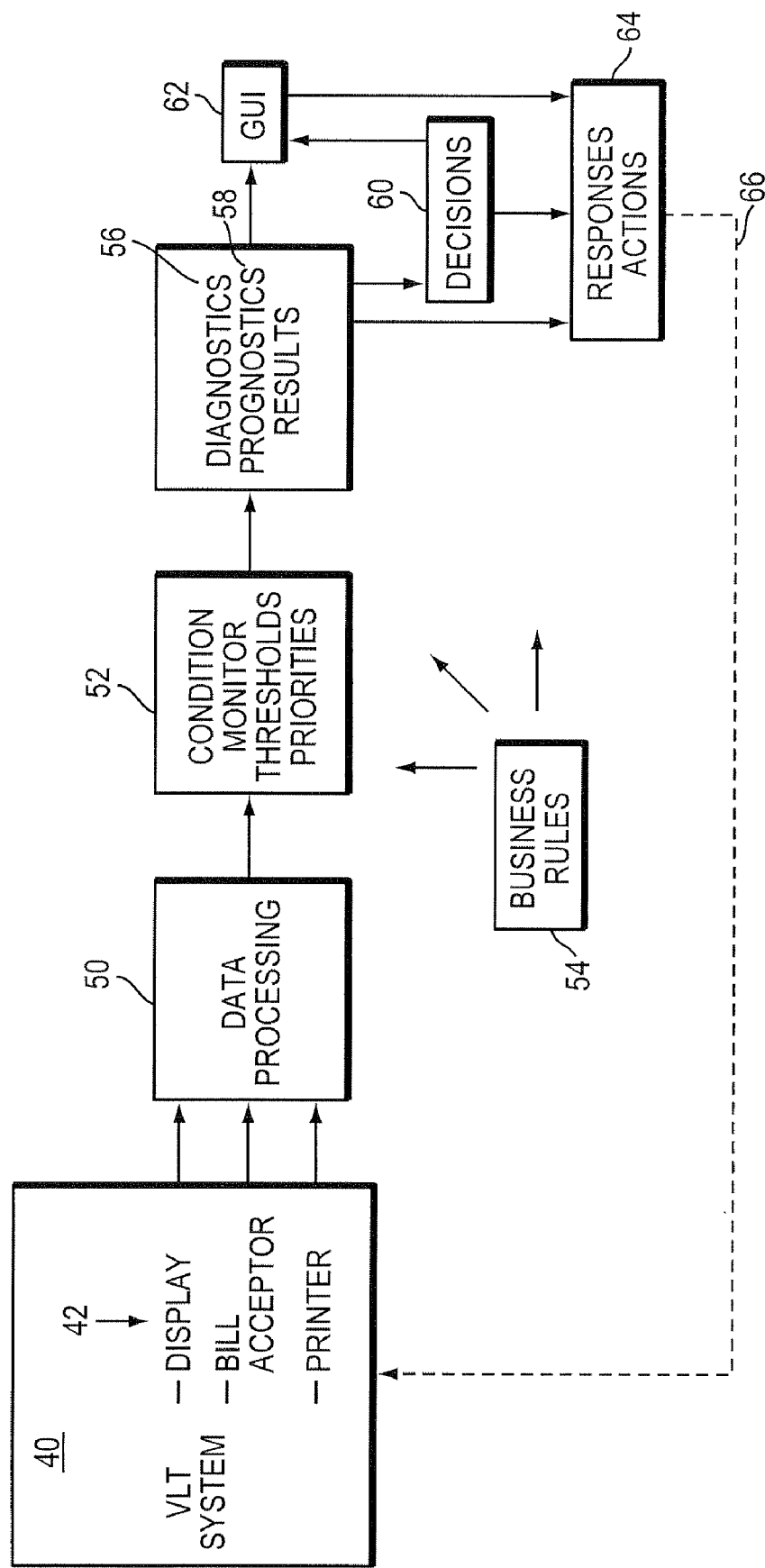
FIG. 3 is a flow, functional chart of operations according to the present invention.

FIG. 3 is an illustrative embodiment block diagram of functions reflecting a maintenance regimen in accordance with the present invention. The functions may be resident in a VLT 40 and/or shared with the Retailer Station or even the Central Controller. The VLT 40 detects and logs events that include issues or problems associated with access doors, bill (currency) acceptors, printers, coin mechanisms, button or touch sensors, the device game itself, power supplies, software and hardware errors, etc. The events may include results from diagnostics and prognostics run on the game devices.

Illustratively in FIG. 3, the data acquisition 42 collects data on the video monitor 44, the printer 46 and the bill acceptor 48. The data from these input/output devices are logged, tracked, processed 50 and tagged with a priority. A condition monitor 52 applies prior established thresholds (developed heuristically or by history) and compares them to the data. Self generated diagnostics 56 or diagnostic 58 initiated by the Retailer Station, the Central Controller or a technician, test many functions and operations of the VLT and tracks and stores the results.

Prognostic tests 58 may be run to identify parts of the VLT that are at risk of failure. Prognostics tests may be scheduled to run at recurring times or may be performed on demand as required. Often the data from these tests warrant automatic responses 60. The responses 64 include communication among the Retailer Station 6, the VLT system itself 4, the Central Controller 10, and a technician 12. The graphical user interface (GUI) 62 is a convenient display where the data and decisions 60 may be visualized for review by a technician or other personnel. Visualizing a problem and an associated decision or provides feed back and control where a human may alter any reaction or response of the system.

Business Rules 54 are configured for responses to the data results for efficient maintenance of the gaming systems.

One benefit of the present invention is that it preserves bandwidth to accommodate low bandwidth networks (dial-up, cellular, satellite, leased lines or wireless) and other systems that may be overloaded at peak traffic times. The low priority and informational data are buffered (stored) at the local game device or the Retailer Station and sent to the Central Controller during low network traffic times. Informational data may include accounting information that is usually sent at the end of the business day.

A partial list of device events incorporated into an illustrative example of the present invention might include: any access door open; the bill validator is: empty, miscounted, jammed, cheated, timed out, full, etc.; the printer is: offline, paper is low, no communications, paper jammed, cutter jammed, mechanism opened, misaligned, timed out (meaning some function had a time limit that expired), etc.; the coin mechanism is: mal-functioned, jammed, empty, electronic signal in error, etc.; touch sensors not responding, cash out buffer full; terminal disabled by Retailer Station or Central Controller; event buffer full; batteries are low, games not installed or enabled or operating; a general system error; the system experienced a power down event; out-dated versions of software or device drivers. When diagnostics are exercised other conditions that may be buffered include cooling fan speed, internal temperatures, presence and use of Flash memory, etc.

In FIG. 3, Business Rules 54 may include the following: a Game Device and the Retailer Station will buffer events including low and informational events and once a day the Retailer Station will send the buffered data to the Central Controller at low network traffic time; high priority events are sent by the Retailer Station immediately to the Central Controller; an authorized system person may be able to initiate and view the results of a self test or diagnostic for a game device from the central controller, the retailer or the game device itself; the central controller may be able to interrogate the retailer or game device for bill acceptor status, memory status, temperature, battery status; the data from self tests and diagnostics may be buffered for reporting and trending analyses. Trending data may include identifying and tracking usage of peripherals, electronic components, sensors, etc.—virtually all components found in a Game Device or Retailer Station wherein the mean time between failure may be estimated and displayed.

Priority is shared by the game device, the Retailer Station and the Central Controller. And priority is high when, usually, when business rules so determine. For example, high priority is when a game device is not operating it is not generating income, or when an entire site of several game devices, or an entire LAN, and entire site or an entire gaming system. But some sites, some LANs, some game devices are more commercially attractive than others and so would have higher priorities. Moreover, some geographic location may be more visible to the public than others or may be more important, for some reason, than other and so may have higher priorities. The human owners of a gaming system or site may set their priorities as they wish.

The business rules 54 may include buffered data mining where programs may process the buffered data to determine identify key attributes of hardware and/or software failures that presage future failures. Predictive events may be visualized and maintenance steps taken or modified to minimize the effects of future failures. In this aspect, the business rules 54 may be amended and/or added to in order to efficiently implement maintenance procedures that minimize these future effects.

Accumulating data may include measuring and storing many different operating parameters and characteristics of game devices and LANs, etc. Viewing changes in these parameters and characteristics may suggest preventative maintenance that pre-empts more costly future failure that would have occurred. Measuring and tracking power usage, down time, temperatures, time that a game device may be being played, or upcoming special usages or occasions may dictate that preventative maintenance. One other important parameter may be the amount of time and type of servicing a technician may have spent on a game device, or at a site or on a LAN or WAN. These an other similar data are predictive in nature and lend to an effective, efficient maintenance system.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A maintenance managing system for gaming devices comprising:
   a graphical user interface that allows a service technician to run and view results of diagnostic and prognostic test programs run from the graphical user interface;
   sensors that monitor mechanical, electrical and software problems of a game device;
   first programs that accumulate the monitored problems;
   thresholds for at least some of the monitored and the anticipated problems;
   business rules that determine responses to the monitored and the anticipated problems;
   processors that run the programs and apply the thresholds where appropriate and the business rules to the monitored and the anticipated problems; wherein the business rules determine an appropriate response; and
   three maintenance states: state one for a down game device; state two for an operating game device; and state three for an operating game device that has reported minor or intermittent problems; and where these states are presented visually to the technician on the GUI along with geographical information of and travel route to the sites to be visited.

2. The maintenance managing system of claim 1 further comprising:
   priorities that are applied to the problems;
   wherein low priority problems await service; and
   high priority problems are scheduled for immediate service.

3. The maintenance managing system of claim 1 further comprising:
   a database storing the problems for the gaming devices;
   wherein when a service visit is scheduled the high and the low priority problems are output to an attending service technician.

4. The maintenance managing system of claim 3 wherein the database stores the high and the low priority problems for all the game devices at a site, and outputs these problems to the attending service technician.

5. The maintenance managing system of claim 1 wherein the programs include self tests, diagnostic tests and prognostic tests.

6. A maintenance managing system for gaming devices comprising:
   sensors that monitor mechanical, electrical and software problems of a game device;
   prognosis programs that anticipates problems for game devices, wherein the prognosis programs include logging the number of times and the amount of time a technician spends on a game device;
   first programs that accumulate the monitored and the anticipated problems;
   thresholds for at least some of the monitored and the anticipated problems;
   business rules that determine responses to the monitored and the anticipated problems and which include the financial aspects of the site containing the game device; and
   processors that apply the thresholds where appropriate and the business rules to the monitored and the anticipated problems and that determine an appropriate response.

7. A method for maintaining game devices comprising the steps of:
- sensing problems in the game device;
- accumulating and storing the problems;
- thresholding at least some of the problems;
- applying business rules to the problems;
- running and viewing results of diagnostic and prognostic test programs from a graphical user interface;
- establishing three maintenance states: state one for a down game device; state two for an operating game device; and state three for an operating game device that has reported minor or intermittent problems; and
- presenting these states to the technician on the GUI along with geographical information of and travel route to the sites to be visited; and
- responding to the problems.

8. The method of claim 7 further comprising the steps of:
- prioritizing the problems;
- scheduling high priority problems for immediate service; and
- scheduling low priority problems to await service.

9. The method of claim 8 further comprising the steps of:
- storing the problems for the gaming devices;
- wherein, when a service visit is scheduled, the high and the low priority problems are output to an attending service technician.

10. The method of claim 9 wherein the storing includes the storing of the high and the low priority problems for all the game devices at a site, and outputting these problems to an attending service technician.

11. The method of claim 7 wherein the programs include self tests, diagnostic tests and prognostic tests.

12. A method for managing a maintenance system for game devices comprising the steps of:
- sensing and monitoring mechanical and electrical problems of a game device;
- anticipating problems for game devices;
- accumulating the monitored and the anticipated problems;
- thresholding for at least some of the monitored and the anticipated problems;
- applying the thresholds where appropriate and business rules, that determine responses to the monitored and the anticipated problems; to the monitored and the anticipated problems;
- running and viewing results of diagnostic and prognostic test programs from a graphical user interface;
- establishing three maintenance states: state one for a down game device; state two for an operating game device; and state three for an operating game device that has reported minor or intermittent problems; and
- presented these states to the technician on the GUI along with geographical information of and travel route to the sites to be visited; and
- responding appropriately.

* * * * *